United States Patent [19]

Hohberg

[11] Patent Number: 5,148,326
[45] Date of Patent: Sep. 15, 1992

[54] MIRROR FOR CHANGING THE GEOMETRICAL FORM OF A LIGHT BEAM

[75] Inventor: Gerhard Hohberg, Aalen, Fed. Rep. of Germany

[73] Assignee: Carl-Zeiss-Stiftung, Heidenheim, Fed. Rep. of Germany

[21] Appl. No.: 737,448

[22] Filed: Jul. 29, 1991

[30] Foreign Application Priority Data

Jul. 27, 1990 [DE] Fed. Rep. of Germany ....... 4023904

[51] Int. Cl.$^5$ .......................... G02B 5/08; B23K 26/00
[52] U.S. Cl. ................................ 359/853; 219/121.74
[58] Field of Search ............... 359/851, 852, 853, 627, 359/618; 219/121.74

[56] References Cited

U.S. PATENT DOCUMENTS

| | | | |
|---|---|---|---|
| 1,919,561 | 7/1933 | Kogel | 359/851 |
| 3,523,721 | 8/1970 | Hofmann | 359/851 |
| 3,613,659 | 10/1971 | Phillips | 359/853 |
| 3,888,589 | 6/1975 | Swift | 350/612 |
| 4,110,009 | 8/1978 | Bunch | 359/853 |
| 4,195,913 | 4/1980 | Dourte et al. | 359/853 |
| 4,302,105 | 11/1981 | Sick | 350/171 |
| 4,484,334 | 11/1984 | Pressley | 359/853 |
| 4,518,232 | 5/1985 | Dagenais | 350/620 |
| 4,553,017 | 11/1985 | Addleman | 219/121.73 |
| 4,620,230 | 10/1986 | Spiger | 350/613 |
| 4,692,583 | 9/1987 | Kimura et al. | 359/851 |
| 4,798,446 | 1/1989 | Hettrick | 350/162.23 |

FOREIGN PATENT DOCUMENTS

| | | |
|---|---|---|
| 0080597 | 6/1983 | European Pat. Off. . |
| 330730 | 10/1935 | Italy . |
| 59-151101 | 8/1984 | Japan . |
| 63-77178 | 4/1988 | Japan . |
| 0160209 | 5/1933 | Switzerland .......... 350/613 |
| 1171744 | 8/1985 | U.S.S.R. ............ 350/162.23 |
| 2062282 | 5/1981 | United Kingdom . |

OTHER PUBLICATIONS

Stanley L. Ream, "A Convex beam integrator", *Laser Focus*, vol. 15, No. 11, Nov. 1979, pp. 68-71.

Primary Examiner—Jon W. Henry
Attorney, Agent, or Firm—Walter Ottesen

[57] ABSTRACT

The invention is directed to a mirror having mutually adjacent segments defined by a body such as a cone, sphere, toroid, paraboloid or ellipsoid having a line focus. The segments are displayed in stepwise manner axially or parallelly laterally to suppress interference or for forming an intensity profile.

10 Claims, 4 Drawing Sheets

MIRROR FOR CHANGING THE GEOMETRICAL FORM OF A LIGHT BEAM

FIELD OF THE INVENTION

The invention relates to a mirror for changing the geometrical form of a light beam. The invention also relates to a method for using the mirror.

BACKGROUND OF THE INVENTION

Mirrors for changing the geometrical form of a beam are widely known. It is difficult to generate a beam cross section which has a configuration which is essentially linear to rectangular and within which the intensity of the beam has a predetermined course, especially is constant in the longitudinal direction. Such beam cross sections are necessary especially for conducting surface treatment with a laser to name only one essential area of application.

My copending application Ser No. 07/788,997, filed Nov. 7, 1991, which is a continuation-in-part application of my patent application Ser. No. 07/505,177, filed on Apr. 5, 1990 and now abandoned, discloses a mirror of the kind referred to above and is incorporated herein by reference.

The transforming optics assure that the laser beam has a cross section which is rectangular to linear when impinging on the work surface and that the intensity within this cross section has almost a constant value. If a beam with this kind of cross section is guided over the workpiece at constant speed and parallel to a pair of edges of the rectangular cross section, then the energy profile within the irradiated strip is uniform.

The lasers used most in practice supply a beam having a cross section which is not rectangular and whose intensity distribution is not uniform. For this reason, optical arrangements are needed which can suitably transform any beam cross section.

Facet mirrors and integrators are two types of transforming optics which are preferably utilized for generating linear geometries with respect to the intensity distribution of laser rays.

Japanese patent publication 63-77178 A discloses a facet mirror having a plurality of planar mirrors which are arranged so as to lie tangentially to a paraboloidal surface in a mosaic-like manner and which concentrate a laser beam on a rectangle having essentially the extent of an individual planar mirror. However, a line profile is not obtainable in this way since the individual mirrors have no focussing effect. The manufacture of such an arrangement is complex.

Facet mirrors are also disclosed in an article entitled "A Convex Beam Integrator" by Stanley L. Ream, published in "Laser Focus", November 1979, pages 68 to 71. Multi-facetted mirrors are also disclosed in U.S. Pat. No. 4,518,232 and in Japanese patent publication 59-151 101 A with the latter having spherical facets.

SUMMARY OF THE INVENTION

It is an object of the invention to impart a line-shaped to rectangular-shaped beam cross section having a predetermined intensity distribution to a light beam having any desired cross section with only one optical imaging with the effects of interferences occurring at longer wavelengths being held as low as possible. The precise production is facilitated by the suitability for inherently precise manufacturing methods.

According to a feature of the invention, the mirror is configured out of a plurality of segments of rotation bodies mounted one next to the other with the segments having respective rotational axes which are at least approximately superposed on each other on a line-shaped to rectangular-shaped region of an object. The size of the segments is so selected that the beam to be converted falls simultaneously on several of the segments and that all segments are so formed and aligned that a zone of the light beam is precisely reflected once by a segment and is directed to a section of the line-shaped to rectangularly-shaped region of the object wherein the rotational axes approximately are superposed and all zones of the light beam are at least approximately superposed on this section with the individual segments being displaced relative to each other in a stepwise manner.

An intense concentration is possible with few segments because of the anamorphotic action of the rotationally-symmetrical mirror segments. The mirror segments are rotation surfaces which can be inherently manufactured with greater precision than planar surfaces.

The special advantage of this mirror is that the light beam can be broken up into several strip-shaped regions which can be superposed on one another and directed to a line with only a single reflection of each light beam region taking place. This optical conversion of the beam geometry can provide an excellent homogeneity of intensity distribution which is influenceable by the number of mirror segments with minimum energy losses for the optical imaging.

Except for the displacement of the segments and the symmetry axes, mirrors corresponding to the invention in their configuration are shown in the above-mentioned United States patent application Ser. No. 07/788,977. With the introduction of the step-shaped displacement of the segments, the coherence conditions for the amounts of light from the individual segments are changed to the extent that interference effects are suppressed.

According to another feature of the invention, the segments are axially stepped relative to each other and this enables the rays reflected from mutually adjacent segments to the linear focus to include a larger angle with each other. In this way, axial interference structures arising in the line focus are structured to be finer and in this way are less disturbing for the mentioned applications.

According to still another feature of the invention, the segments with their rotational axes are displaced parallelly and laterally in a stepwise manner relative to each other. In this way, the interferences can be virtually completely avoided. With a larger increased lateral displacement, the superposed region becomes rectangular and, perpendicularly to the rotational axes (in the case of an application for laser machining in the supply direction), a specific intensity profile can be generated by providing a displacement of the segments to a specific zone of the light beam having a different overall intensity.

The characteristics described in the above-mentioned U.S. patent application Ser. No. 07/788,977 apply also to the mirror according to the invention and this application is also for this reason incorporated herein by reference.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
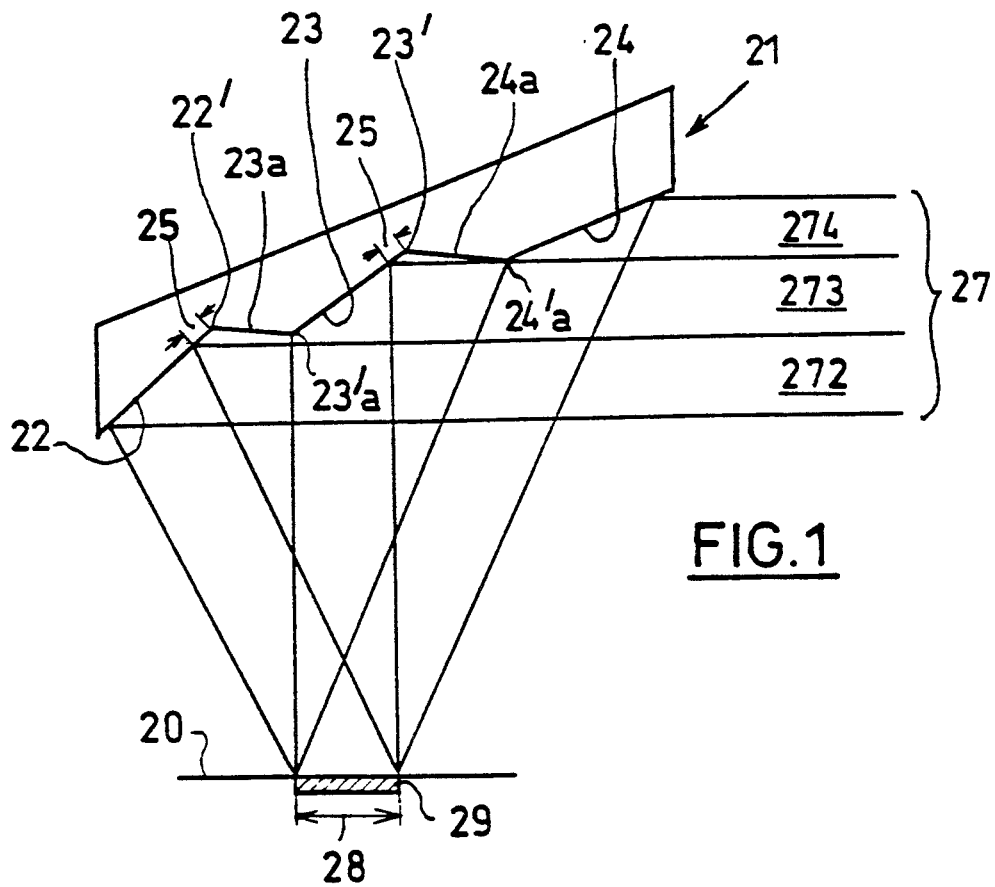
FIG. 1 is a cross section taken through a first embodiment of the mirror according to the invention having axially displaced conical segments and showing a light beam having parallel light rays incident upon these segments.

FIG. 1 shows a mirror 21 which images an incident light beam 27 on a line-shaped region 28 of an object 29. The line-shaped region 28 lies on the common rotational axis 20 of the conical mirror segments (22, 23, 24). The segments (22, 23, 24) are selected with respect to number, size, axial spacing and aperture angle of the cone so that each segment (22, 23, 24) images a zone of the incident light beam with a single reflection on the line-shaped region 28 as a linear focus and that the total incident light beam 27 is detected.

The foregoing is disclosed in United States patent application Ser. No. 07/788,977 referred to above. However, with respect to the embodiment of FIG. 1, a stepwise axial displacement of the individual segments (22, 23, 24) with respect to each other is introduced by the insertion of shaded intermediate pieces (23a, 24a) of any desired contour. With this feature, the angles between the bundle of rays impinging on the line-shaped region 28 from the individual segments (22, 23, 24) are increased and in this way, the interferences between these respective sets of rays are structured so as to be tighter and therefore less disturbing.

The intermediate pieces (23a, 24a) arranged between the mirror segments (22, 23, 24) are so configured that they are shaded by the edges (23a', 24a') of the particular forward segment (23, 24) from the incident light beam 27. Also shaded by these edges is a small region 25 of each next adjacent segment (22, 23).

The mirror can be assembled from the individual segments (22, 23, 24) and intermediate rings (23a, 24a).

The mirror can also be machined without difficulty from one piece such as by diamond turning. The necessary turning tools for the production (such as individual diamonds) of a mirror 21 of the invention always have rounded cutting edges. For this reason, pointed recesses (22', 23') as shown in FIG. 1 at the connection locations between the segments (22, 23, 24) and the intermediate pieces (23a, 24a) can be only incompletely realized. The projecting pointed edges (23a', 24a') can be manufactured even with rounded tools. However, the pointed recesses (22', 23') lie in the shaded region of the forward segments and therefore do not participate in the imaging process. For this reason, their precise production is not important.

Figure 2:
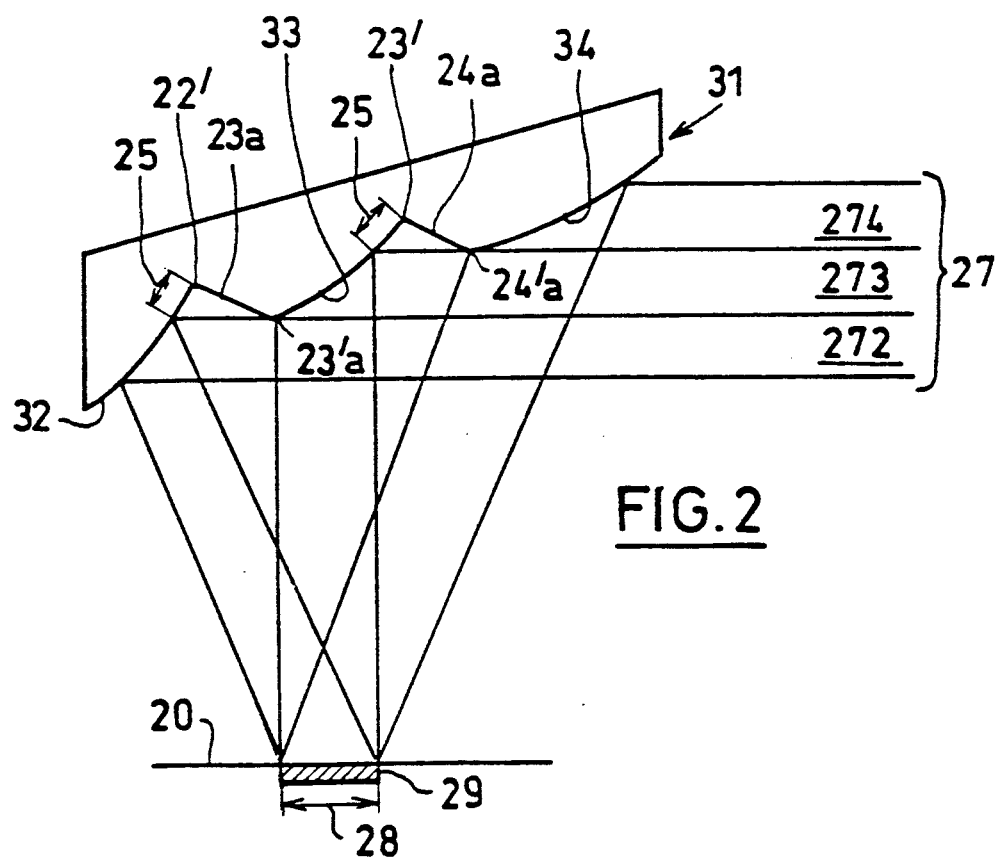
FIG. 2 is a section view taken through another embodiment of the mirror of the invention wherein the mirror has axially displaced convex segments with the incident beam of light having parallel rays.
Figure 3:
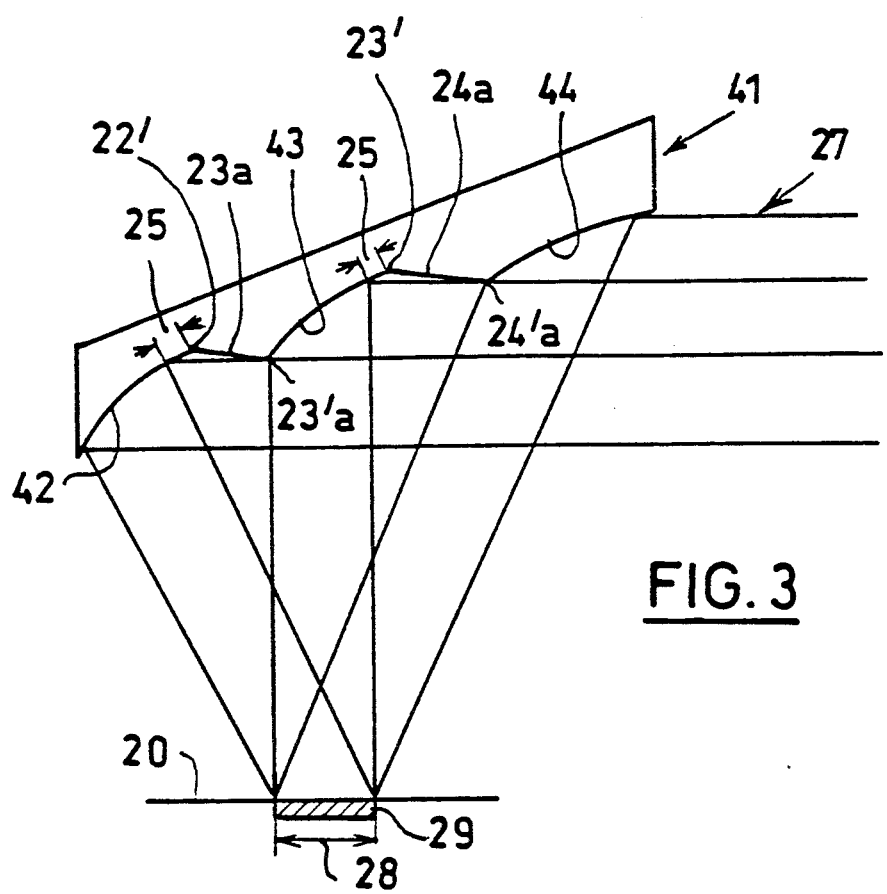
FIG. 3 is a section view of another embodiment of the mirror of the invention having concave segments axially displaced and showing the incident light beam having parallel rays.

In FIG. 2, the reflective segments (32, 33, 34) are curved so as to be convex while in FIG. 3, the reflective segments (42, 43, 44) are curved so as to be concave. Otherwise, the mirrors (31, 41) are configured in the same manner as mirror 21 of FIG. 1 and the same reference numerals are used.

For the mirrors (31, 41) having curved mirrored segments (32, 33, 34; 42, 43, 44) as shown in FIGS. 2 and 3, the advantage is provided that the number (and therefore the length) of the segments (32, 33, 34; 42, 43, 44) on the one hand and the length of the line-shaped region 28 on the other hand can be selected independently of each other.

In correspondence to the desired applications and the specified requirements as to the intensity distribution, the segments (32, 33, 34; 42, 43, 44) in the embodiments of FIGS. 2 and 3 are of circular, parabolar or elliptical cross section in the direction of the rotational axis so that toroidal, spherical, paraboloidal or ellipsoidal surfaces are provided as reflective segments (32, 33, 34; 42, 43, 44). Deviating forms can be advantageous for special intensity distributions in the direction of the rotational axis.

For appropriate computation of the mirror (21, 31, 41), the angles of incidence of the laser beam 27 as well as the geometrical characteristics thereof can be varied within a wide range.

Figure 4:
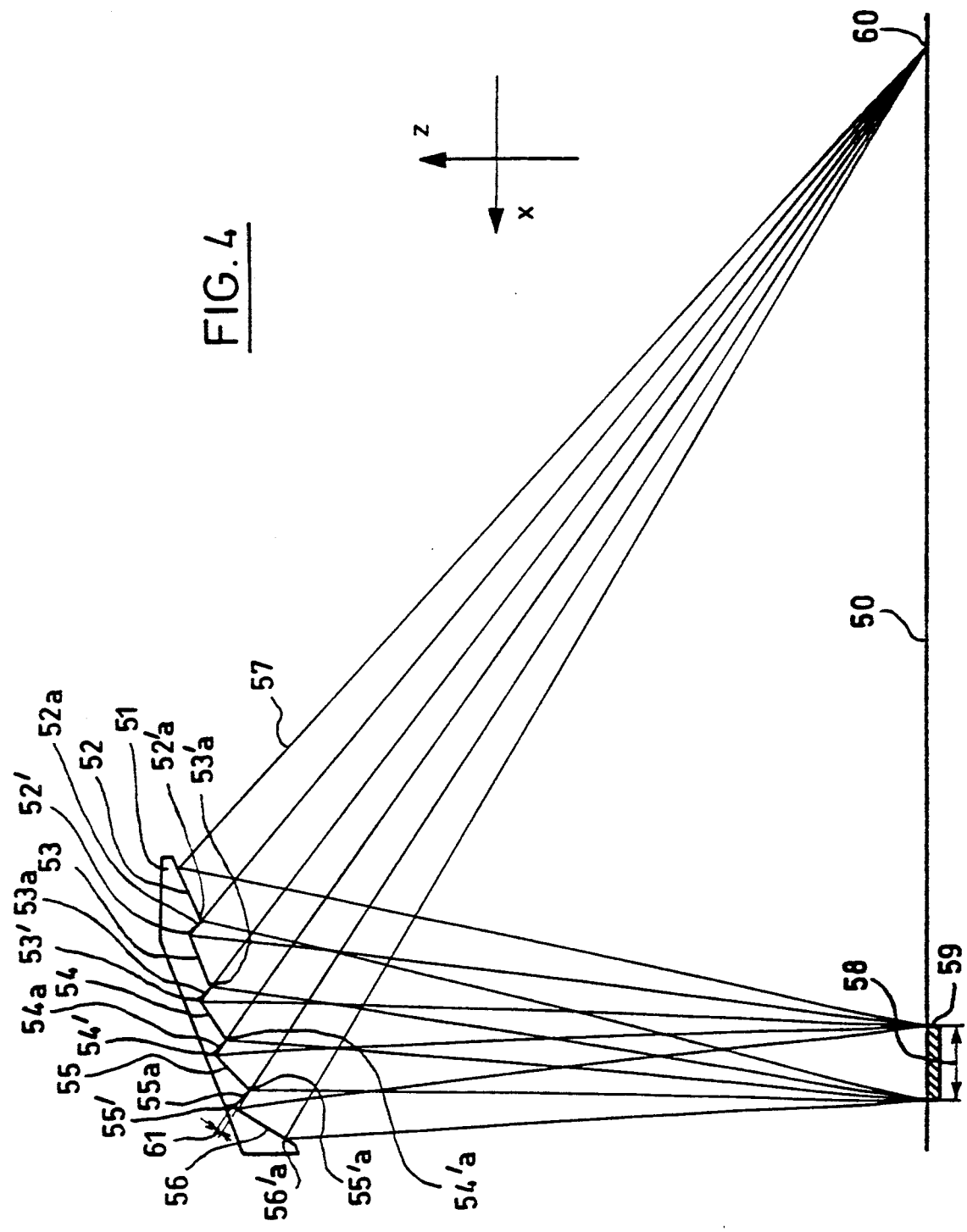
FIG. 4 is a section view taken through still another embodiment of the mirror of the invention having conical segments axially displaced with respect to each other and showing the incident light with divergent rays.

In FIG. 4, the application of a mirror 51 for irradiating the surface of a workpiece 59 in a linear work region 58 on the rotational axis 50 of the mirror 51 is shown. The light beam 57 is then imaged neither parallelly nor paraxially to the rotational axis 50; instead, the light beam is imaged divergently with a source point 60 on the rotational axis 50. Accordingly, the light beam 57 is imaged by the five segments (52 to 56) of the mirror 51 on the line-shaped work region 58 with a jump of the image from the end of the work region 58 to its beginning being provided at the rearward edges (52a' to 56a') of the segments (52 to 56). The work region 58 is in this case an interval on the rotational axis 50. Inclinations and lengths of the conical segments (52 to 56) are so selected that the corresponding focal lines on the rotational axis 50 are all the same length and have the same position. The suitable measurements can be calculated easily with known numerical computing processes.

The mirror 51 is built up in a step-like manner as the mirrors (21, 31, 41) shown in FIGS. 1 to 3. The mirror 51 includes intermediate pieces (52a to 55a) disposed between the different mirror segments (52 to 56) and shaded by the respective forward mirror segments (52 to 55). In this mirror 51 also, a portion of each of the rearward segments (53 to 56) is shaded by a corresponding one of the forward segments (52 to 55). A shaded region 61 of segment 56 is identified in the drawing as exemplary. Although the light beam 57 emanating from the source point 60 does not impinge axially parallel on the mirror 51, the advantages discussed with respect to FIGS. 1 to 3 are provided here.

Figure 5:
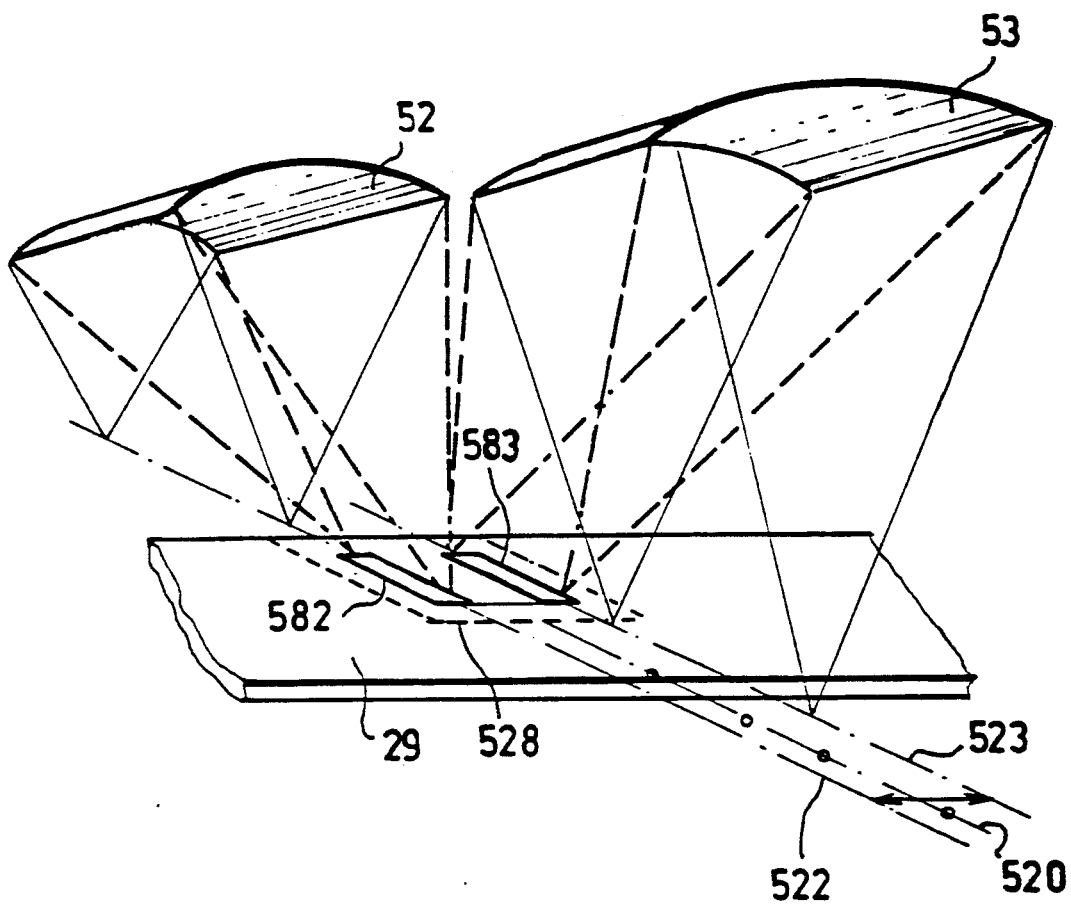
FIG. 5 is a perspective schematic view of another embodiment of the invention wherein the segments are displaced laterally from each other in a step-like manner; and, FIG. 6 is a simplified schematic of the embodiment of FIG. 5 wherein the segments are displaced laterally relative to each other in a step-like manner with this schematic showing also the intensity profile corresponding thereto.
Figure 6:
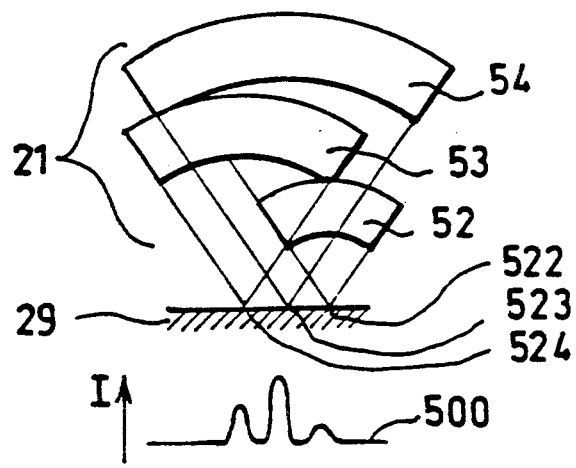

FIGS. 5 and 6 illustrate a variation of the mirror 21 in that the segments (52, 53, 54) with their rotational axes (522, 523, 524) are displaced in a stepwise manner laterally relative to each other. FIG. 5 shows a perspective view while FIG. 6 shows a front elevation view together with a resulting intensity profile 500.

Segments (52, 53, 54) of rotational bodies such as in the above figures are displaced with their rotational axes (522, 523, 524) parallelly in the lateral direction with respect to a center axis 520. The line foci (582, 583) of the individual segments (52, 53) lie on a corresponding one of the rotational axes (522, 523) in a rectangularly-shaped region 528 on the object 29. A displacement of 0.1 to 0.3 mm is typical. A displacement of approximately the width of the individual line foci of the segments (52, 53, 54) is adequate for suppressing disturbing interferences. With a larger displacement, a rectangularly-shaped region can be illuminated with a targeted intensity profile. This takes place in that different intensities are imparted to mutually adjacent individual lines. The variation of the intensities can take place over the segment width or simply by utilizing the fact that the segments (52, 53, 54) can be illuminated differently according to the profile of the light beam 27. Certain freedoms are available because mutually adjacent lines (582, 583) must not be generated from neighboring segments (52, 53, 54). The displacement of each segment (52, 53, 54) can be selected independently as shown in FIG. 6.

The limits are obtained in that the number of the segments (52, 53, 54) and therefore the number of mutually adjacent lines (582, 583) must be held small so that the intensity drop at the ends of the lines (582, 583) is not flattened too intensely by diffraction phenomena.

In FIG. 6, the segments (52, 53, 54) are drawn having the same sector angles for emphasis. The size of the sectors (52, 53, 54) is to be so selected that the light beam 27 can be fully collected thereby as in the previous embodiments and so that no gap occurs.

The manufacture of a mirror 21 having a lateral displacement of the rotational axes is realized by displacing the body of the mirror in the holder of a lathe after each individual segment (52, 53, 54) is machined.

Other forms of the displacement are for example the vertical displacement which effects a defocussing of the contributions of the individual segments and the displacement by tilting the rotational axes.

It is understood that the foregoing description is that of the preferred embodiments of the invention and that various changes and modifications may be made thereto without departing from the spirit and scope of the invention as defined in the appended claims.

What is claimed is:

1. A mirror for changing the geometric form of a laser light beam reflected onto an object having a surface region thereon which has a line-shaped to strip-shaped configuration, the mirror comprising:
   body means having a plurality of mirror surface segments formed therein with each of said mirror surface segments being a portion of a body defining a surface of revolution;
   said surfaces of revolution defining respective rotation axes which are at least approximately superposed on said surface region of said object;
   said mirror surface segments having respective sizes selected so as to cause respective zones of said light beam to simultaneously impinge on several of said mirror surface segments;
   said mirror surface segments being formed and positioned relative to each other so that each of said zones is reflected only once by the surface segment corresponding thereto and is directed onto said region of said object such that the laser light of all of said zones is at least partially superposed in said surface region so as to obtain a concentrated illumination thereof for performing work on said object; and,
   said mirror surface segments being spatially offset one from the other.

2. The mirror of claim 1, said axes conjointly defining a single axis common to all of said mirror surface segments; and, said mirror surface segments being offset stepwise one from the other along said axis.

3. The mirror of claim 1, said mirror surface segments being arranged relative to each other so as to cause said rotation axes of the respective surfaces of revolution to be offset laterally one from the other.

4. The mirror of claim 3, said surface region of said object being strip-shaped and said surface segments being positioned with a pregiven spacing for each of said rotation axes so as to cause a specific intensity profile to be generated perpendicular to said rotation axes on said region of said object.

5. The mirror of claim 1, said mirror being assembled from separate body means for each of said mirror surface segments to a compact component.

6. The mirror of claim 1, said body means comprising a single part defining said plurality of mirror surface segments.

7. The mirror of claim 1, said mirror surface segments all having shaped different from each other.

8. The mirror of claim 1, said surfaces of revolution being selected from the group comprising a cone, sphere, toroid, ellipsoid and paraboloid.

9. The mirror of claim 1, wherein said mirror is a precision diamond turned piece.

10. A method for treating an object with a mirror for changing the geometric form of a light beam of a laser reflected onto the object having a surface region thereon which has a line-shaped to strip-shaped configuration, the mirror including: a plurality of segments formed on rotation body means; body means having a plurality of mirror surface segments formed therein with each of said mirror surface segments being a portion of a body defining a surface of revolution; said surfaces of revolution defining respective rotation axes which are at least approximately superposed on said surface region of said object; said mirror surface segments having respective sizes selected so as to cause respective zones of said light beam to simultaneously impinge on several of said mirror surface segments; said mirror surface segments being formed and positioned relative to each other so that each of said zones is reflected only once by the surface segment corresponding thereto and is directed onto said region of said object such that the laser light of all of said zones is at least partially superposed in said surface region so as to obtain a concentrated illumination thereof for performing work on said object; and, said mirror surface segments being spatially offset one from the other; the method comprising the step of positioning said mirror in said beam for irradiating the object stripwise.

* * * * *

UNITED STATES PATENT AND TRADEMARK OFFICE
CERTIFICATE OF CORRECTION

PATENT NO. : 5,148,326

DATED : September 15, 1992

INVENTOR(S) : Gerhard Hohberg

It is certified that error appears in the above-identified patent and that said Letters Patent is hereby corrected as shown below:

In the Abstract, line 4: delete "displayed" and substitute -- displaced -- therefor.

In column 2, line 38: delete "Ser. No. 07/788,977" and substitute -- Ser. No. 07/788,997 -- therefor.

In column 2, line 65: delete "Ser. No. 07/788,977" and substitute -- Ser. No. 07/788,997 -- therefor.

In column 3, line 46: delete "Ser. No. 07/788,977" and substitute -- Ser. No. 07/788,997 -- therefor.

In column 6, line 35: delete "shaped" and substitute -- shapes -- therefor.

Signed and Sealed this

Fourteenth Day of September, 1993

Attest:

BRUCE LEHMAN

*Attesting Officer*  *Commissioner of Patents and Trademarks*